Jan. 23, 1951 A. SAGEN 2,539,274
TIRE CHANGING DEVICE
Filed June 13, 1947 2 Sheets-Sheet 2
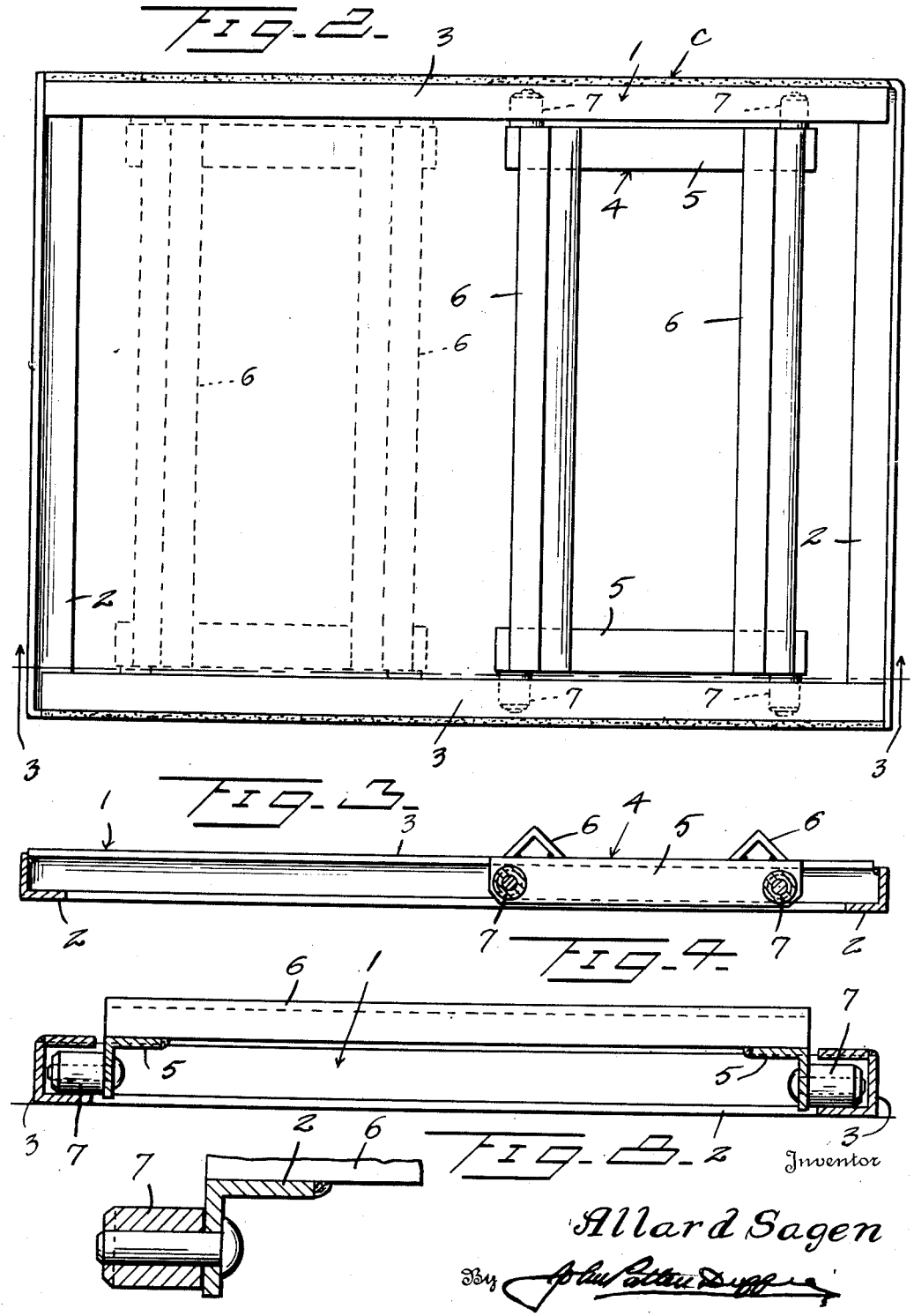
Inventor
Allard Sagen
By
Attorney Patented Jan. 23, 1951

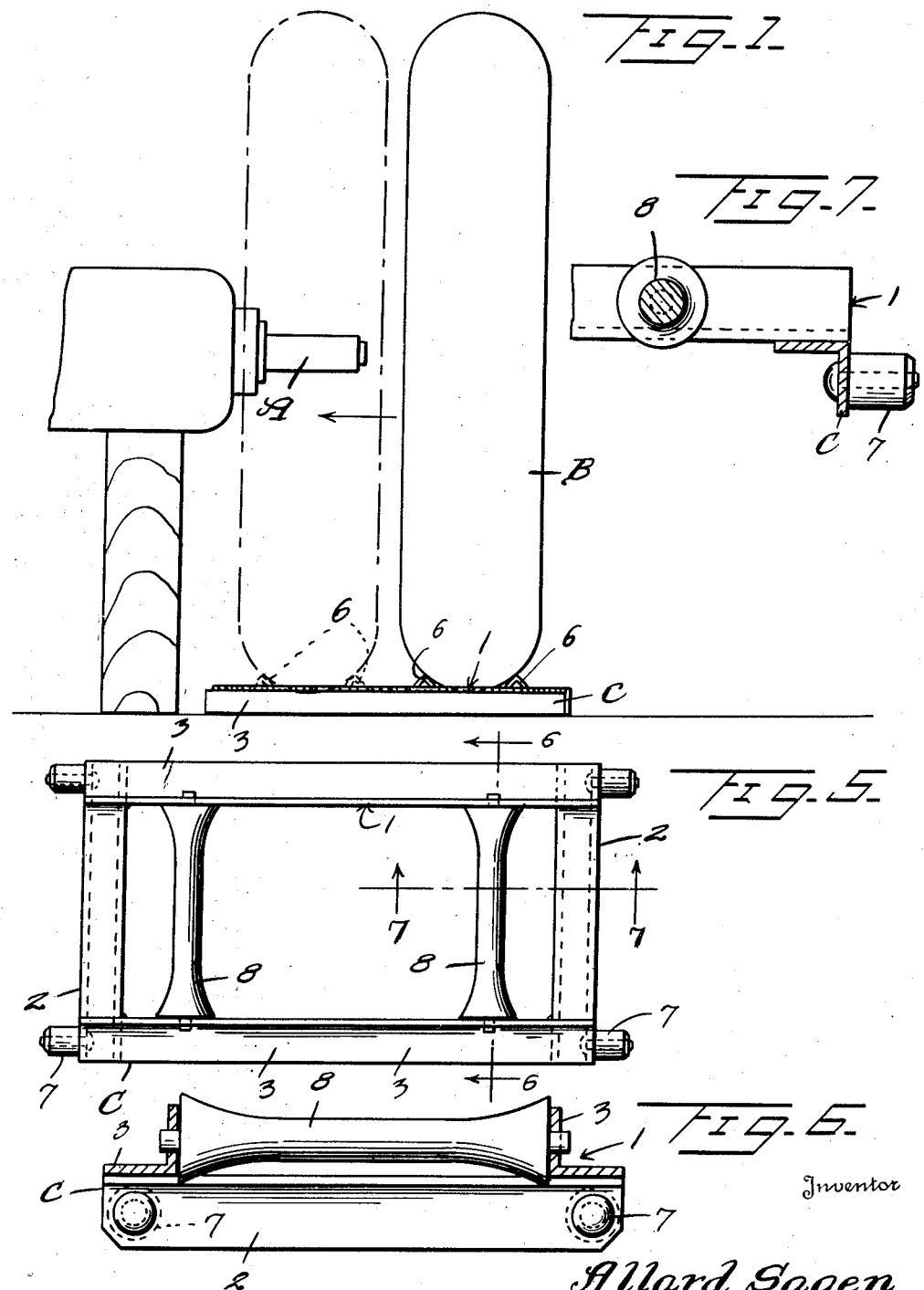

2,539,274

UNITED STATES PATENT OFFICE 2,539,274

TIRE CHANGING DEVICE

Allard Sagen, Moorhead, Minn.

Application June 13, 1947, Serial No. 754,517

1 Claim. (Cl. 214—1)

This invention relates to new and useful improvements in tire changing devices.

The primary object of my invention is to provide a device of the character specified that will facilitate the removal and installation of heavy duty tires and wheels on large trucks, busses, farm tractors, etc. It will enable one man to apply a tire weighing over one thousand pounds by simply jacking up the axle, rolling the tire onto the cradle of the tire changing device and shoving the cradle until the hub of the wheel slips onto the axle.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is an edge view, illustrating the application of my invention.

Figure 2 is a plan view of my tire changing device per se.

Figure 3 is a vertical longitudinal section, taken on line 3—3 of Figure 2.

Figure 4 is a vertical transverse sectional view of the machine.

Figure 5 is a plan view of a modified form of cradle.

Figure 6 is an enlarged vertical transverse section, taken on line 6—6 of Figure 5.

Figure 7 is an enlarged vertical longitudinal section, taken on line 7—7 of Figure 5, and Figure 8 is an enlarged detail fragmentary sectional view of one of the cradle rollers and associated parts.

Referring to the drawings for a more particular description of my invention, and in which drawings like parts are designated by like reference characters throughout the several views, A designates the axle, B the tire and C my novel tire changing device, as a whole.

Specifically, my tire changing device comprises the rectangular oblong base or platform 1, consisting of the end angle bars 2 and longitudinal track forming bars 3 of U-shape form in cross section, suitably connected at opposite ends to the ends of the angle bars 2.

A cradle 4, consisting of the end angle bars 5 connected together by a pair of corresponding transverse longitudinally spaced rail bars 6, of inverted V-shape form in cross section, is mounted to slide along the base or platform 1. This is accomplished by means of the outwardly extending rollers 7, which work in the longitudinal track forming bars 3.

For the sake of explanation, it may be stated that a rubber tired wheel weighing five hundred pounds or more will not slide readily on the ground, and without the use of my novel tire changing device, three or four men are required to apply the tired wheel to the axle. With the use of my invention, however, one man can easily accomplish this result by first jacking up the axle, then lining up the tired wheel with the axle and finally exerting a push against the cradle to slide the tire into place.

In the modified form of my invention illustrated in Figures 5 to 7, inclusive, of the drawings, instead of providing the cradle with spaced rail bars 6, between and on which the base and tread of the tire rests, the base or platform 1 is provided with a pair of corresponding transverse rollers 8 on which the tread and base of the tire rest.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent, is:

A tire changing device of the character specified, comprising a base or platform of rectangular oblong form, consisting of longitudinal track bars of U-shape form in cross section, connected at opposite ends by transverse angle bars, a cradle slidable longitudinally of the stationary platform and comprising angle end bars connected by a pair of corresponding transverse rail bars of inverted V-shape form in cross section between and on which the base of the tire rests, and rollers carried by the depending side portions of the angle end bars of the cradle and working in the U-shaped track bars of the platform.

ALLARD SAGEN.

REFERENCES CITED

The following references are of record in the file of this patent:

UNITED STATES PATENTS

| Number | Name | Date |
|---|---|---|
| 1,535,762 | Brejska | Apr. 28, 1925 |
| 1,829,023 | Swartout | Oct. 27, 1931 |
| 1,847,549 | Adams | Mar. 1, 1932 |